L. J. TETLOW.
TROLLEY WHEEL.
APPLICATION FILED MAY 4, 1909.
1,000,854.
Patented Aug. 15, 1911.
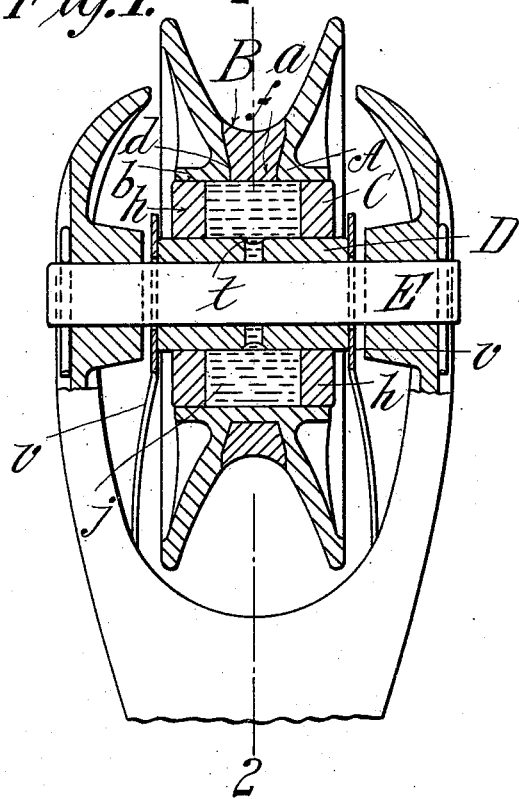
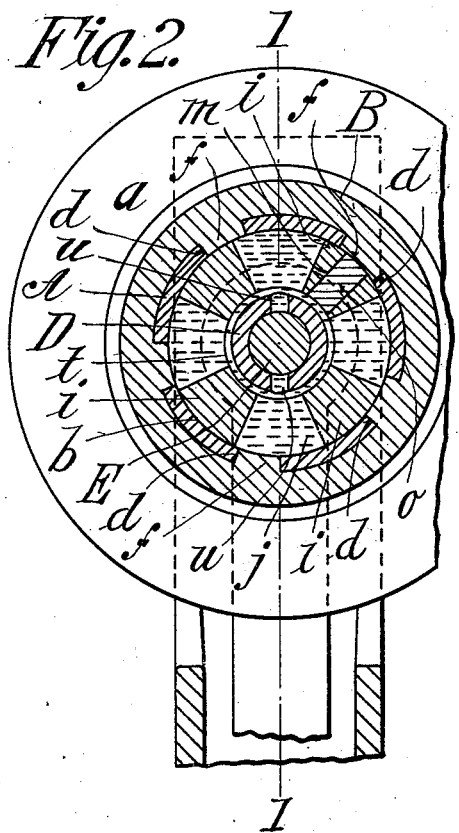
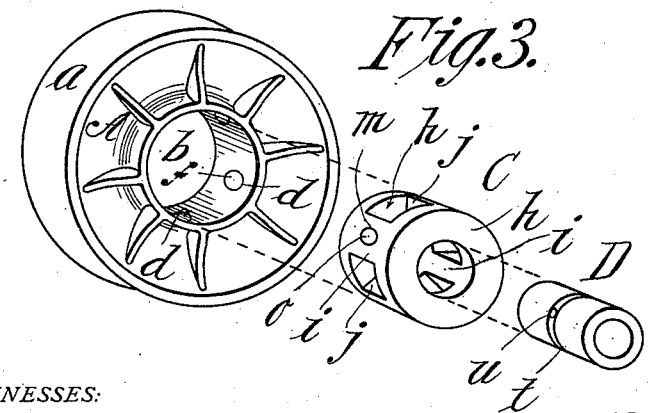
WITNESSES:
INVENTOR,
Lewis J. Tetlow,
BY
ATTORNEY.

UNITED STATES PATENT OFFICE.

LEWIS J. TETLOW, OF HOLYOKE, MASSACHUSETTS, ASSIGNOR TO NEW ENGLAND TROLLEY WHEEL COMPANY, OF HOLYOKE, MASSACHUSETTS, A CORPORATION OF MASSACHUSETTS.

TROLLEY-WHEEL.

1,000,854.    Specification of Letters Patent.    Patented Aug. 15, 1911.

Application filed May 4, 1909. Serial No. 493,947.

*To all whom it may concern:*

Be it known that I, LEWIS J. TETLOW, a citizen of the United States of America, and resident of Holyoke, in the county of Hampden and State of Massachusetts, have invented certain new and useful Improvements in Trolley-Wheels, of which the following is a full, clear, and exact description.

One object of this invention is to provide a construction of trolley wheel which is largely composed of iron, such wheel including, however, portions of brass, copper, or like metal of high conductivity which impart all requisite operative capabalities to the wheel, but which acquire, in the production of the latter a very appreciable decrease in cost.

Another object of the invention is to provide in a wheel having the characteristics such as above set forth, means for the lubrication in relation to the axle carried in the harp on which the wheel is rotatively mounted.

The invention consists in the combination or arrangement of parts and the constructions of certain of the parts all substantially as hereinafter described in conjunction with the accompanying drawings and set forth in the claims.

In the drawings:—Figure 1 is a sectional view through the improved trolley wheel on the plane of its axis, such wheel being shown as mounted in a harp. The section line 1—1, on Fig. 2 indicates the plane on which Fig. 1 is taken. Fig. 2 is a sectional view at right angles to Fig. 1, taken on the line 2—2. Fig. 3 is a perspective view showing, in separated relations, the body of the wheel, the lubricant casing and the bushing, structural features of all of which will be hereinafter particularly pointed out.

Similar characters of reference indicate corresponding parts in all of the views.

In the drawings,—A represents the body of the trolley wheel, the same being composed of iron and constructed with a peripheral groove $a$ and a central cylindrical aperture $b$. The grooved and centrally apertured body of the wheel has essentially a hole $d$ extended radially from the central aperture $b$ to the base of its peripheral groove,—although in practice a plurality of these apertures $d$ are included in the iron wheel body.

B represents a trolley wire bearing portion of brass, bronze or like good conducting metal cast in the base of the groove and having inwardly projecting extensions $f$ thereof interlocked in and filling the aforementioned radial holes $d$.

C represents a casing for constituting the lubricant holder, the same consisting of a member of generally annular form comprising opposite end cheeks $h$ $h$ and spaced cheek-connecting portions $i$ $i$, said annular member being tightly fitted in the central aperture of the wheel body, the lubricant chambers $j$ $j$ being created and separated one from another by the said cheek connecting portions $i$,—and these lubricant chambers are outwardly closed by the internal wall of the wheel body A. One of the said cheek connecting portions $i$ has a hole $m$ extending radially from its periphery to the central opening in the annular member C, said hole being in registry with one of the radial holes $d$ in the iron wheel body and having a piece $o$ of copper, or like good conducting metal therein, the outer end of such conducting piece having connection with one of the inward extensions $f$ of the brass or bronze trolley wire bearing portion B.

D represents a bushing sleeve of brass or like good conducting metal, tightly fitted in the central aperture of the said annular member and having a peripheral groove $t$ between its ends in communication with each and all of the aforementioned radially arranged and inwardly opening lubricant chambers $j$; and the said bushing has a duct, or a pair of ducts $u$ leading from the peripheral groove to its central axle bore through which the supporting axle E is fitted.

The bushing D is, as shown in Fig. 1, slightly longer than the axial dimension of the annular lubricant carrying member C so as to project at opposite ends beyond the cheeks of said member whereby the trolley wheel receives on the ends of the brass bushing the bearing of the contact springs $v$ $v$,—the course of the current, as apparent, being from the trolley wire to and through the annular brass or bronze portion B and by way of one of the extensions $f$ thereof to and through the copper plug or piece $o$, the inner end of which has a contact on, or connection with, the bushing, and thence by way of the bushing to the contact springs, finally being carried through the trolley harp and pole as usual.

The annular member C is connected into the central opening of the wheel body with a driving fit and when once therein is secure against accidental displacement; and the bushing D is also connected into the central opening of the annular member C with a driving fit and is secure against accidental displacement therefrom.

In the making of this trolley wheel a quantity of heavy grease is forced into and fills the radial chambers $j$ $j$ in the part C, after such part has been forced into the wheel body and before the bushing is driven into the said part C; and the freedom of the delivery of the lubricant may be predetermined by making the annular groove and the ducts $u$, either or both, larger or smaller, as dictated by the judgment of the constructor and as influenced by the character of the lubricant to be employed.

Under and in accordance with this invention, a steel body is to be considered as the equivalent of an iron body, and the trolley wire bearing part B, the bushing D, and the piece or plug $o$ which forms good electrical connection between the parts B and D, may be of any metal or composition of satisfactorily high conductivity, the same being generally one having copper as a large component.

I claim:—

1. A trolley wheel body having a central, cylindrical transverse opening therein, a tubular member tightly engaged in said central opening, said tubular member having a plurality of equally spaced radial openings, extending entirely therethrough, a bushing tightly engaged in said tubular member and having an oil duct formed therethrough, and means other than the material of said tubular member and of greater conductivity than said tubular member providing electrical connection between said bushing and the trolley wheel body.

2. A trolley wheel comprising a peripherally grooved and centrally apertured body composed of iron, and constructed with a hole extended radially from the central aperture to the base of its peripheral groove, a trolley wire-bearing portion composed of a metal of better conductivity than that from which the body is made, cast in the base of the groove and having an inwardly projecting extension thereof interlocked in and filling said radial hole, an annular member comprising opposite end cheeks and spaced cheek-connecting portions tightly fitted in the central aperture of the wheel body, creating lubricating chambers separated by the said connecting portions, and one of said connecting portions having a hole therethrough extending radially from its periphery to the central opening in the annular member, said hole being in registry with the radial hole in the iron wheel body and having a piece of the metal of better conductivity therein, the outer end thereof forming connection with said inward extension of the trolley wire bearing portion, a bushing sleeve of the metal of better conductivity, tightly fitted in the said annular member, having a peripheral groove between its ends, in communication with said lubricant chambers, and having a duct leading from said groove to its axle receiving bore,—said bushing sleeve being peripherally in connection with said last named piece.

Signed by me at Springfield, Mass., in presence of two subscribing witnesses.

LEWIS J. TETLOW.

Witnesses:
 WM. S. BELLOWS,
 G. R. DRISCOLL.

---

Copies of this patent may be obtained for five cents each, by addressing the "Commissioner of Patents. Washington, D. C."